March 18, 1969   F. A. LOEBEL   3,433,717
MULTISTAGE FLASH STILL WITH VAPOR COMPRESSION PLANT
Filed March 1, 1965   Sheet 1 of 3

Inventor
Frederick A. Loebel
By Hofgren, Wegner,
Allen, Stellman & McCord
Attys

United States Patent Office 3,433,717
Patented Mar. 18, 1969

3,433,717
MULTISTAGE FLASH STILL WITH VAPOR
COMPRESSION PLANT
Frederick A. Loebel, Milwaukee, Wis., assignor to Aqua-Chem, Inc., a corporation of Wisconsin
Filed Mar. 1, 1965, Ser. No. 435,847
U.S. Cl. 202—173    3 Claims
Int. Cl. C02b 1/06; B01d 3/06

ABSTRACT OF THE DISCLOSURE

A vapor compression plant having a multi-stage flash evaporator serving as a brine preheater for a vapor compression evaporator and compressor. The multi-stage flash evaporator can be divided into a heat rejection section and a heat regenerative section. A heat exchanger serves to preheat make up water by extracting heat from the distillate prior to adding the preheated make up water to an intermediate stage of the multi-stage flash evaporator. The preheated water entering the vapor compression evaporator substantially increases the distillate producing capacity of the plant.

---

This invention relates to the evaporation of a liquid from a solution by the general method of distillation, and it is illustrated herein as embodied in a process and apparatus particularly designed for purification of sea water by distillation to secure a potable product for drinking and for other purposes. The process and apparatus are readily adapted for similar treatment of other liquids and with or without modification are equally adapted for other uses in the art which incude distillation, evaporation, concentration, and the like, all of which include the evaporation of liquid.

In the past, a vapor compression evaporator has been used in conjunction with a brine feed water heat exchanger to distill liquids, such as sea water. The productivity of such an installation may be increased by increasing the operating temperature in the compressor still. However, there are several disadvantages in doing this. Firstly, a larger brine feed water heat exchanger is necessary, significantly increasing the cost of the installation. Secondly, the scaling and corrosion problems are significantly increased in the brine heat exchanger.

In addition to the vapor compression process described above, it has been conventional in the past to employ flash evaporators for distilling liquids. These flash evaporation systems have rather severe economic limitations.

It is, therefore, an object of the present invention to provide a new and improved apparatus and method for distilling liquids which require less capital investment than prior systems and further provide greater operating economies than heretofore known. These economies result from combining a vapor compression still with a multi-stage flash evaporator. As an example, the total cost of water produced by the combined vapor compression and flash evaporation plant would be about 6 to 12% less than that produced by a multi-stage flash evaporation plant alone. This is because the total energy requirement of the combination plant is about one-third of that of the flash plant. The flash evaporator necessary in the combined plant is only 15% of the size necessary for a straight flash plant of comparable output, which is one of the factors contributing to the over-all capital investment saving. Further, in the present combined plant, the cost savings in system steam over the straight flash plant, more than offsets the compressor energy requirement of the combined plant so that the over-all operating cost of the combined plant is significantly less than the straight flash.

Another object of the present invention is to provide a new and improved apparatus and method for evaporating liquids in which a multi-stage flash evaporator is employed for preheating liquid flowing to a vapor compression evaporator. All of the concentrate or brine in the vapor compression plant is returned to the flash evaporator where a small portion of the concentrate evaporates producing distillate in addition to that produced in the vapor compression evaporator. However, most of the distillate is produced in the vapor compression plant. The use of a flash evaporator as a preheater for incoming liquid has several advantages over a conventional heat exchanger. Firstly, if a conventional heat exchanger were employed, the brine or concentrate flowing through the heat exchanger would be in places difficult to clean whether inside or outside the heat exchanger tubes. In the present system, the concentrate or brine flows into the multi-state flash chambers which obviates the accessibility problem in heat exchangers. Secondly, the flash evaporator in the present system produces distillate in addition to that produced in the vapor compression plant, which a conventional heat exchanger is incapable of doing.

Other objects and advantages will be apparent from the following detailed description taken in connection with the accompanying drawings, in which.

While illustrative embodiments of the present invention are shown and will be described in detail, it should be understood that the embodiments illustrated are intended to set forth the principles of the invention and not to limit the scope thereof. The scope of the invention will be pointed out in the appended caims.

Figure 1:
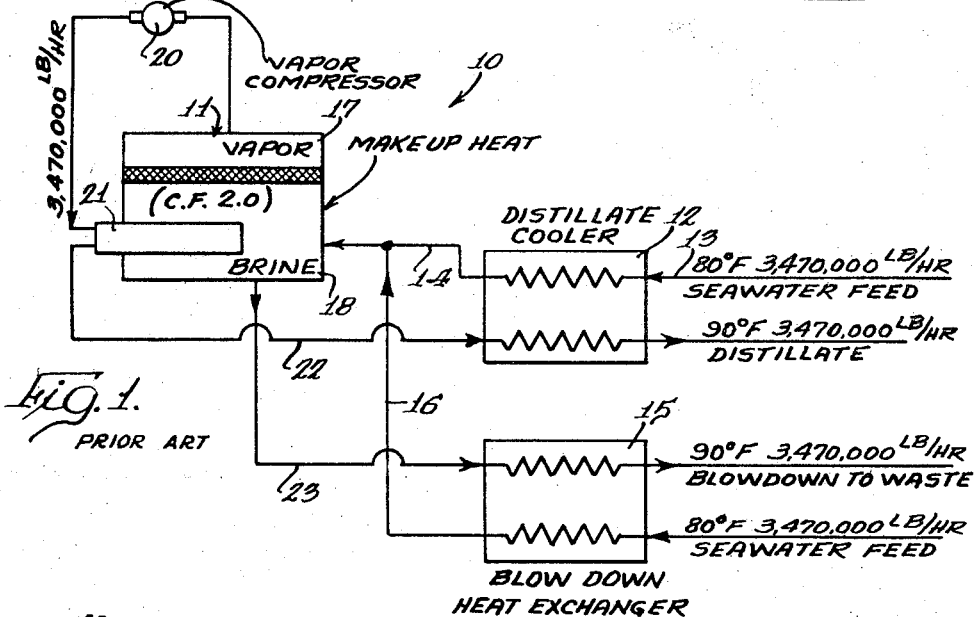
FIGURE 1 is a schematic illustration of a conventional vapor compression evaporator with a heat exchanger.

Referring to FIG. 1, a conventional vapor compression distilling plant designated by the numeral 10 is seen to consist generally of a vapor compressor 20, an evaporator 11, a distillate cooler 12, and a blowdown heat exchanger 15. The distillate cooler 12 is simply a heat exchanger which receives sea water through line 13 and preheats it. Preheated water is conveyed through line 14 to the vapor compression evaporator 10. An additional quantity of sea water is also preheated in the blowdown heat exchanger 15 and delivered to line 14 and the vapor compression evaporator 11 through line 16. The vapor compression evaporator 11 separates preheated liquid so that the vapor moves into a vapor head 17 and the concentrate or brine is collected in a bottom head 18. The vapors in the vapor head 17 are compressed by the vapor compressor 20 and delivered to a suitable condenser 21 which condenses the vapors to form distillate by transferring heat in out-of-contact relation to the preheated water. Distillate is returned from the condenser 21 through line 22 to the distillate cooler 12 where it passes in out-of-contact heat exchange relation with the incoming sea water to cool the distillate and preheat the sea water. Brine or concentrate in the bottom head 18 is returned through line 23 to the blowdown heat exchanger 15 and passes therethrough in out-of-contact heat transfer relation to the incoming sea water. From there the concentrate is dumped. Disadvantages in this prior art vapor compression system will be apparent to those skilled in this art from the detailed description of the present combined system described below.

Figure 2:
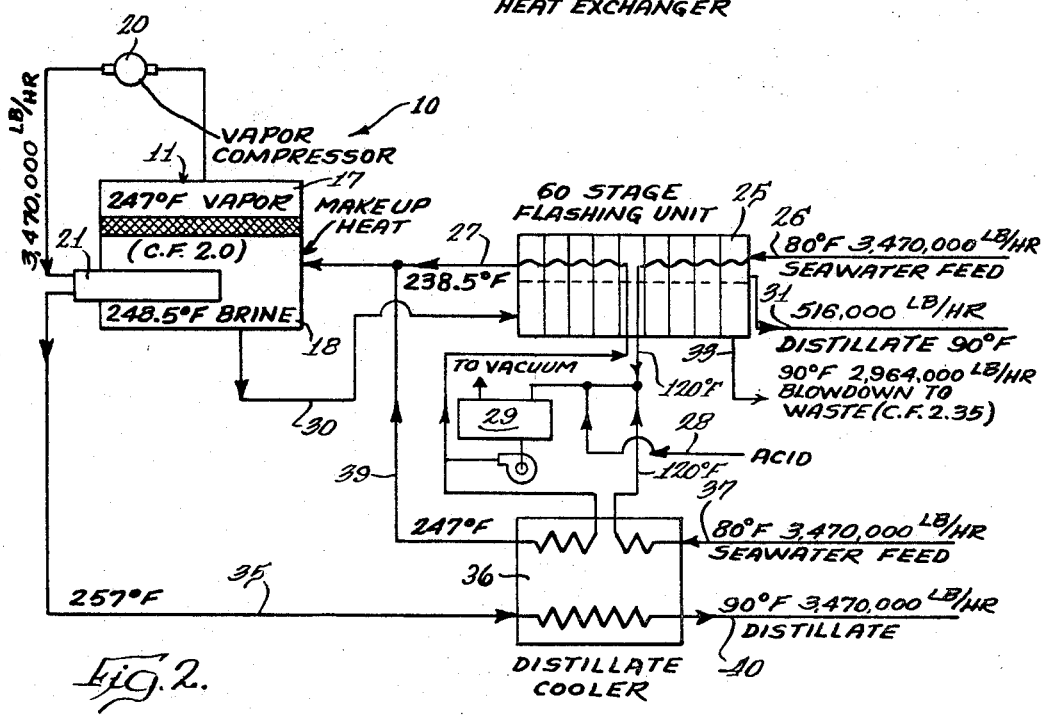
FIGURE 2 is a schematic illustration of the present vapor compression and flash evaporator apparatus.

Referring to FIG. 2, a vapor compression evaporator 10 is provided similar in construction to the vapor compression evaporator shown in FIG. 1, and for that reason has been designated with like reference numerals. However, it will be apparent to those skilled in the art that the size of the vapor compression evaporator 10 in the present invention may be somewhat smaller and less expensive than the vapor compression evaporator shown in FIG. 1 for a given distillate output because of the increased efficiency. A multiple stage flash evaporator 25 is provided for preheating the incoming sea water and flashing or evaporating a portion of the concentrate to provide additional distillate over that produced by the vapor compression evaporator 10. The number of stages provided in the evaporator 25 may be varied depending upon the desired capacity of the apparatus, but sixty stages have been designated as exemplary for the flow figures noted in FIG. 2. However, a minimum of 20 stages should be provided to give the best results. The flash evaporator 25 is by itself a conventional unit and may be of the single pass type.

Sea water is supplied to the flash evaporator 25 through line 26. The sea water passes from stage to stage in the condensers of the right half of evaporator 25 where the water is preheated as some of the vapors from the flash chambers are condensed.

The partially preheated sea water has a suitable acid added thereto as indicated at 28. The treated water is then deaerated in vacuum deaerator 29 and returned to the left half of the flash evaporator 25 for further preheating. By deaerating the sea water after it is partially preheated, the work of deaeration is less than it would be on the relatively cooler incoming sea water. The preheated water flows from the condenser tubes indicated by numeral 27. The brine or concentrate in bottom head 18 is conveyed through line 30 to the flash evaporator 25. Line 30 directs the brine to the first flash chamber of the evaporator 25 where the brine moves from stage to stage. Some of the brine or concentrate flashes into a vapor producing additional distillate when said vapor is condensed in the condensers of the evaporator 25 in out-of-contact relation to the incoming sea water. Said distillate passes from the condenser area of the evaporator 25 through a suitable outlet 31. The brine or concentrate in the last stage chamber is dumped, as shown at 33.

The distillate from condenser 21 is conveyed through line 35 to a distillate cooler or heat exchanger 36 similar to that shown at 12 in FIG. 1. The distillate is cooled by incoming sea water from line 37 which passes in out-of-contact heat exchange relation therewith. The incoming sea water in line 37 is thereby preheated.

The partially preheated sea water in the distillate cooler 36 is combined with sea water from the flashing unit 25 and acid treated and passed through the vacuum deaerator 29. From the deaerator 29, the partially preheated sea water is returned to the condenser section of the flash evaporator 25 and after passing through the remaining condenser chambers the sea water is conveyed to the vapor compressor supply line 27. Part of the sea water from deaerator 29 is passed through the distillate cooler to line 39 and joins line 27 from the condenser of flash evaporator 25. Cooled distillate is discharged from the cooler 36 through line 40.

An important feature of the vapor compression system as shown in FIG. 2, is that the vapor compression evaporator 10 with its evaporator 11 and vapor compressor 20 does most of the work in producing distillate. The flash evaporator 25 is primarily a preheater for the incoming sea water, and produces only about 15% of the total distillate of the system as may be seen from the flow values in FIG. 2. The vapor compression evaporator 10 produces about 85% of the distillate. For these reasons, the flash evaporator 25 is much smaller than would be necessary if the flash evaporator were designed to produce the total distillate. This selection of the relative vapor compressor size to flash evaporator size yields efficiencies and cost reductions not heretofore known in the distillate production field.

Figure 3:
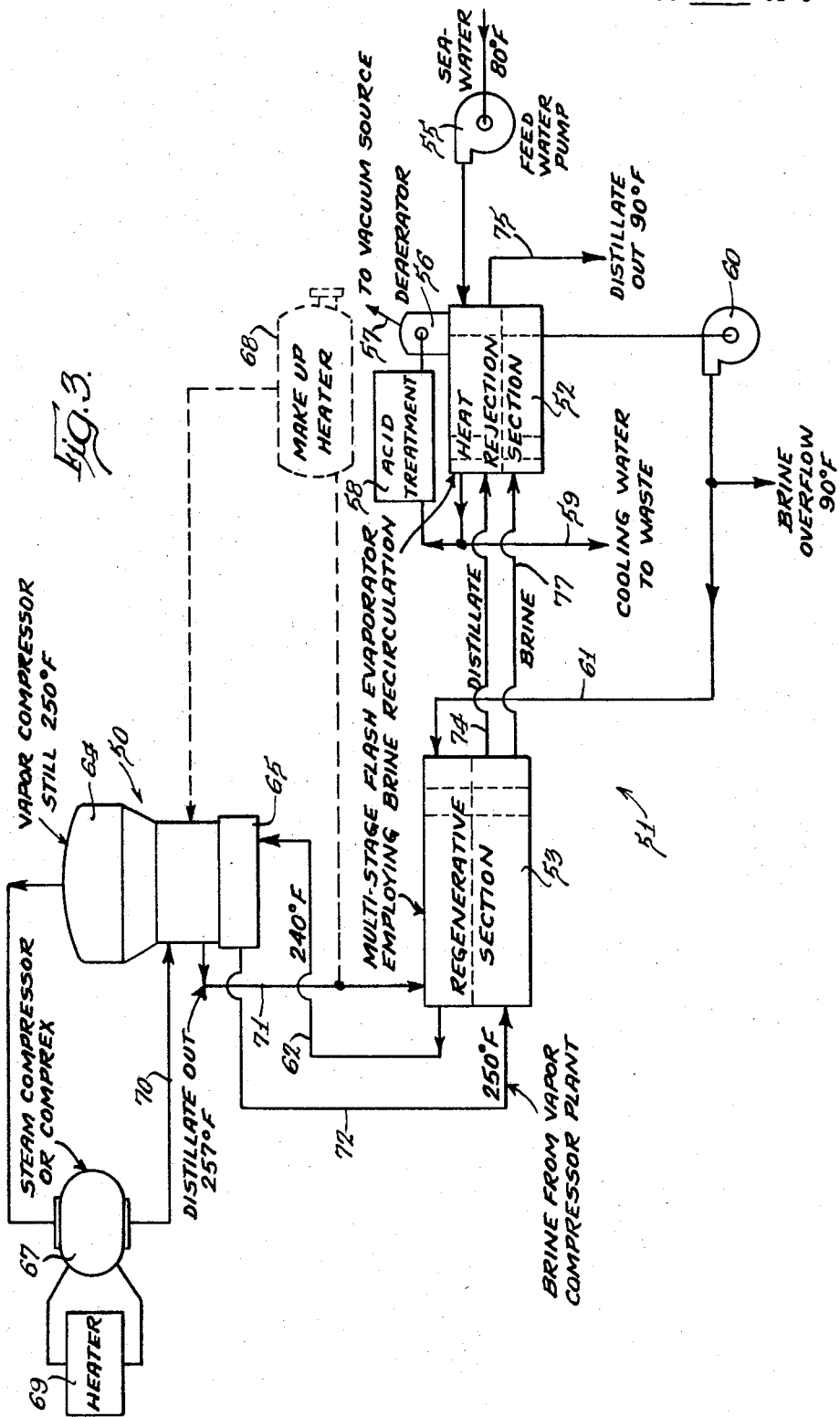
FIGURE 3 is a schematic illustration of another form of the present invention employing a recirculating multi-stage flash evaporator.

Referring now to FIG. 3 wherein a second embodiment of the present combined vapor compression and flash evaporation apparatus is shown, this embodiment differs generally from the FIG. 2 embodiment in that a recirculating flash evaporator is employed for preheating the recirculating liquid and cooling the distillate from the vapor compressor in the flash evaporator rather than in a separate heat exchanger. The FIG. 3 embodiment is seen to consist generally of a vapor compression still 50 and a multi-stage flash evaporator 51. The flash evaporator 51 is of generally conventional design of the type having brine recirculation. Evaporator 51 consists generally of a heat rejection section 52 and a regenerative section 53 each having multiple stages. Evaporator 51 functions to preheat the incoming and recirculating liquid flash a portion of the brine or concentrate from the vapor compression still 50 to produce additional distillate, and recirculate the concentrate or brine. The use of a flash evaporator in this manner results in efficiencies not heretofore known in distillation plants.

A feed water pump 55 is provided for supplying sea water to the heat rejection section 52 of the flask evaporator 51 where it is passed through the condensing areas of the heat rejection section stages to condense vapors to form distillate in out-of-contact heat exchange relation thereto. An acid treatment 58 is provided for the sea water leaving the condenser tubes of the heat rejection section 52. This adds a suitable quantity of an acid, such as sulphuric acid, to the sea water. A deaerator 56 is provided for sea water in the heat rejection section 52 and is connected to a suitable vacuum source indicated at 57. As the evaporator 51 employs brine recirculation, some of the cooling sea water is conveyed to waste from the heat rejection section 52 through line 59. Some of the sea water is treated and combined with brine in the last stage of the heat rejection section and the combined brine is supplied by a recirculating pump 60 through line 61 to the condenser tubes of the last stages in the regenerative section 53. The last stages of the regenerative section are selected so that they provide the proper heat exchange conditions with the temperature of the brine from the last stage of the heat rejection section. Recirculated brine is preheated in the regenerative section and passed through line 62 to the vapor compression still 50. The vapor compression still 50 vaporizes some of the preheated brine or fluid and the resulting vapor flows to a vapor head 64 leaving the brine or concentrate in bottom well 65. The vapor in vapor head 64 is drawn off and compressed by a comprex 67, described in more detail below. If a more conventional steam compressor is employed, then a makeup heater, as shown in dotted lines at 68, is desirable to add heat to the vapor compression still 50. When a comprex is employed, however, enough heat may be added by heater 69 to satisfy the requirements of the vapor compression still 50. The heated and compressed vapor from comprex 67 is returned through line 70 to the heat transfer section of vapor compression still 50 where it is condensed in conventional fashion. The resulting condensate or distillate is delivered through line 71 to the first stage of the regenerative section 53 of the flash evaporator 51 where it is cascaded over the condenser tubes therein, thereby cooling the distillate as it flows from stage to stage and preheating the recirculated brine in the condenser tubes.

All of the concentrate or brine in the vapor compression hot well 65 is transferred through line 72 to the regenerative section 53 where it passes from flashing chamber to flashing chamber in the stages producing vapor in each said stage as said brine gives up heat.

A small portion of this concentrate or brine that has flashed in said chambers produces vapor which condenses to additional distillate in the condensers of the regenerative section. The distillate in the last stage of the regenerative section 53, which includes distillate from the vapor compression still 50 and also that produced in the regenerative section, flows through line 74 to the heat rejection section 52 where is is cascaded over the condensing tubes. Distillate is then discharged through line 75.

Brine from the last stage of the regenerative section 53 is transferred to the heat rejection section 52, indicated by line 77. In the heat rejection section, the brine is transferred from flash chamber to flash chamber producing vapor as said brine gives up heat. Some of this brine that has flashed into vapor is condensed in the condensers of the heat rejection section producing still more distillate. Relatively cool brine in the last stage of the heat rejection section 52 is drawn off by the recirculating pump 60.

The relative size of the flash evaporator 51 and the vapor compression still 50 is similar to that of the FIG. 2 embodiment but is more flexible in relative size. Flash evaporator 51 serves primarily as a preheater for the incoming and recirculating water, while the vapor compression still 50 is sized to do most of the work in producing distillate.

In both the FIG. 2 and FIG. 3 embodiments, because most of the distillate is produced in the high temperature vapor compressor and only a portion of distillate is produced in the flash evaporator, the concentration of the brine in the flash evaporator is at least 1½ times greater than the concentration of the sea water. The acid treatment is necessary in reducing scaling in the flash evaporator and the vapor compression evaporator although other treatments such as ion exchange, seeding or chemical precipitation methods may be used in place of the acid treatment. In this regard the outgoing brine in both embodiments is only 10° F. above the incoming sea water.

In both FIGS. 2 and 3 embodiments, the vapor compressor evaporator 10 or vapor compression still 50 are operated at high temperature, i.e. 247° F. and 250° F. respectively. A significant advantage from this is that the size and horsepower requirement of the associated compressor are reduced. This is because the work of compression per temperature rise decreases when higher still temperatures are employed. The sea water deaerators and acid treatment contribute to the use of the higher compression evaporator temperatures in one way by reducing scaling in the system components.

Figure 4:
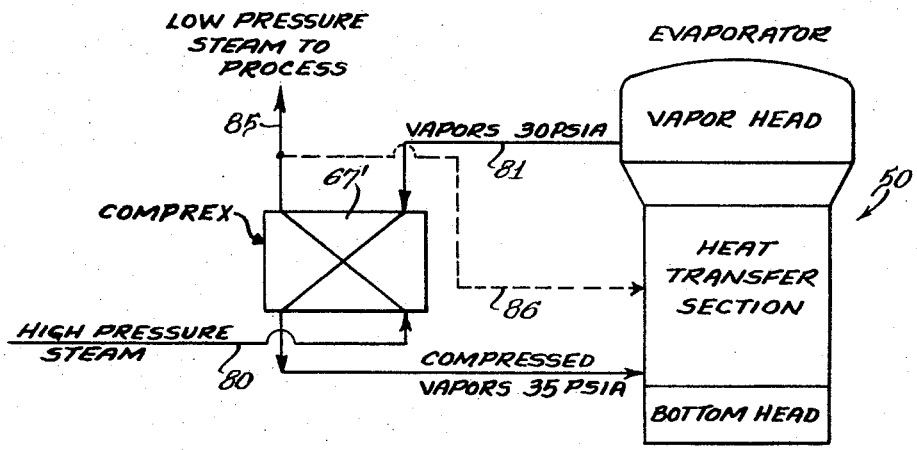
FIGURE 4 is a schematic illustration of an alternative vapor compressor suitable for use in the present apparatus.
Figure 5:
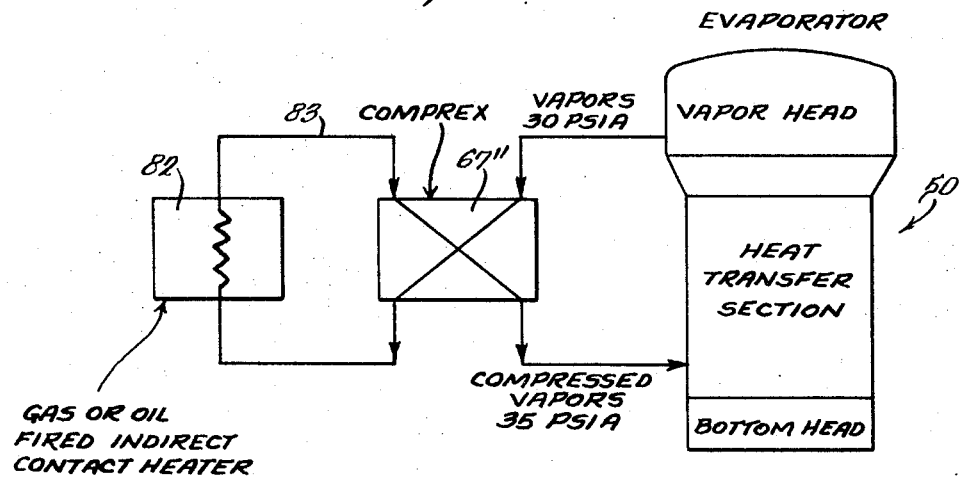
FIGURE 5 is a schematic illustration of still another vapor compressor suitable for use in the present apparatus.

Referring now to FIGS. 4 and 5, two alternatives are shown for the compressor in conjunction with the vapor compression still 50. As noted above, the vapor compression evaporator is provided with a compressor for compressing and raising the temperature of vapors from the vapor head and delivering the vapors to the heat transfer section of the vapor compression evaporator or still. Comprex 67', shown in FIG. 4, may be employed in place of a conventional compressor with new and unusual results. It consists generally of a rotary valving element driven by a suitable motor. The rotary valving element has chambers which selectively communicate with compressed gas inlet and outlet ports and compressing gas inlet and outlet ports. As the element or rotors rotates, low pressure gas to be compressed is admitted to one of the chambers from the compressed gas inlet port at one end of the rotor. Subsequently, high pressure compressing gas is admitted to the chamber from the compressed gas inlet port at the other end of the rotor. The admission of this high pressure gas creates a shock wave in the chamber that travels faster than the high pressure gas and which serves to compress the low pressure gas at the other end of the chamber. The compressed gas is then ported from this chamber through the compressed gas outlet port. An expansion wave causes the compressing gas, which remains in the chamber after the compressed gas is ported therefrom, to flow from the chamber through the compressing gas outlet port. Low pressure gas to be compressed is then admitted to the chamber through the compressed gas inlet port which serves to scavenge the chamber of compressing gas and begin a new cycle. The rotary motion of the rotor does not effect the work of compression but serves only to sequentially open and close the ports.

Referring to FIG. 4, comprex 67' has chambers which receive a column of vapors from line 81. These vapors are the low pressure gas to be compressed, as described above. High pressure steam, the compressing gas, is then admitted to the chamber serving to compress the low pressure vapors. The compressed vapors are then ported to the heat transfer section. The residual steam, used in compressing the vapors, may be directed to other portions of the system, as indicated by line 85, or alternatively this low pressure steam may be directed to the heat transfer section, as makeup heat as indicated by dotted line 86. This may eliminate the necessity of a makeup heater such as shown at 68 in FIG. 3.

Comprex 67" shown in FIG. 5 is similar to that shown in FIG. 4 except that a heater 82 is provided which heats the circulating vapors and eliminates the necessity for a separate source of compressing gas. Heated vapors in line 83 pass through the comprex and provide the compressive shock wave in a manner similar to the high pressure steam in line 80 of the FIG. 4 embodiment. The FIG. 5 embodiment also has the advantage that it may eliminate the necessity for an additional makeup heater such as that shown at 68 in FIG. 3. This heat is supplied by a gas or oil fired heater 82. Note that the vapors themselves circulate through the heater 82.

I claim:

1. An apparatus for evaporating and distilling liquids, comprising: means for preheating incoming liquid including a multiple stage flash evaporator and heat exchanger, said multiple stage flash evaporator preheating a first portion of the incoming liquid, each stage of said flash evaporator including a flash chamber having a condensing section, means for supplying said first portion of the incoming liquid to the condensing sections of said flash evaporator, a vapor compression evaporator for vaporizing the preheated liquid and leaving concentrate, a heat exchanger for preheating the remaining portion of the incoming liquid, means for delivering substantially all of the preheated liquid from the flash evaporator condensing sections and the heat exchanger to said vapor compression evaporator, said vapor compression evaporator including a compressor for compressing the vapor and an evaporator chamber, condensing means in said evaporator chamber for condensing the compressed vapor, said vapor compression evaporator being adapted to condense said vapor thereby producing distillate, said vapor compression evaporator being constructed to provide the major portion of evaporation of the apparatus, means connecting the vapor compression evaporator and the heat exchanger to convey the distillate to the heat exchanger in heat exchange relation with said remaining incoming liquid to cool the distillate and preheat said remaining portion of the incoming liquid, and means connecting the vapor compression evaporator and the flash evaporator to convey all of the concentrate from said vapor compression evaporator to the flash chambers of said flash evaporator, said flash evaporator flashing a small portion of said concentrate to produce additional distillate and with the flashing vapors condensing in said condensing sections thereby preheating said first portion of said incoming liquid.

2. An apparatus for evaporating and distilling a liquid, comprising: a multiple stage flash evaporator including a heat rejection section and a regenerative section, a vapor compression evaporator, each of said sections including a plurality of flash chambers having condensing sections, means for supplying incoming liquid to the condensing sections of said regenerative section to preheat the same, means for delivering substantially all of the preheated liquid from the condensing sections of said regenerative section to said vapor compression evaporator, said vapor compression evaporator being adapted to vaporize a portion of said preheated liquid producing distillate and leaving concentrate, means connected to said vapor compression evaporator to convey substantially all of said concentrate from the vapor compression evaporator to the flash chambers of said regenerative section to evaporate a portion of said concentrate thereby producing a relatively small amount of additional distillate, means for conveying the concentrate from the flash chambers of said regenerative section to the flash chambers of said heat rejection section for evaporating a further portion of said concentrate, and means for recirculating the concentrate from the flash chambers of said heat rejection section to the condensing sections of said regenerative section, said means for delivering preheated liquid to said vapor compression evaporator conveying substantially all of the recirculated concentrate from said condensing sections of said regenerative section to said vapor compression evaporator, said vapor compression evaporator being constructed to produce substantially more distillate than said flash evaporator.

3. An apparatus as defined in claim 2, and further including means connected to said vapor compression evaporator for delivering distillate to the condensing sections of said regenerative section in out-of-contact relation with said incoming liquid and the recirculated concentrate to preheat the same and cool the distillate, means for conveying the distillate from the condensing sections of said regenerative section to the condensing sections of said heat rejection section, and means for supplying relatively cool liquid to the condensing sections of said heat rejection section in out-of-contact relation with said distillate to cool the distillate.

References Cited

UNITED STATES PATENTS

| | | | |
|---|---|---|---|
| 3,218,241 | 11/1965 | Checkovich | 203—11 X |
| 2,759,882 | 8/1956 | Worthen et al. | 202—174 X |
| 2,908,618 | 10/1959 | Bethon | 202—174 |
| 3,105,020 | 9/1963 | Silver et al. | 202—173 X |
| 3,119,752 | 1/1964 | Checkovitch | 202—173 X |
| 3,152,053 | 10/1964 | Lynam | 159—2 X |
| 3,257,290 | 6/1966 | Starmer | 202—173 |

NORMAN YUDKOFF, *Primary Examiner.*

J. SOFER, *Assistant Examiner.*

U.S. Cl. X.R.

203—26, 11